June 23, 1953 J. W. HAMILTON 2,643,139
QUICKLY OPERABLE CONDUIT CLAMP
Filed March 22, 1951 3 Sheets-Sheet 3
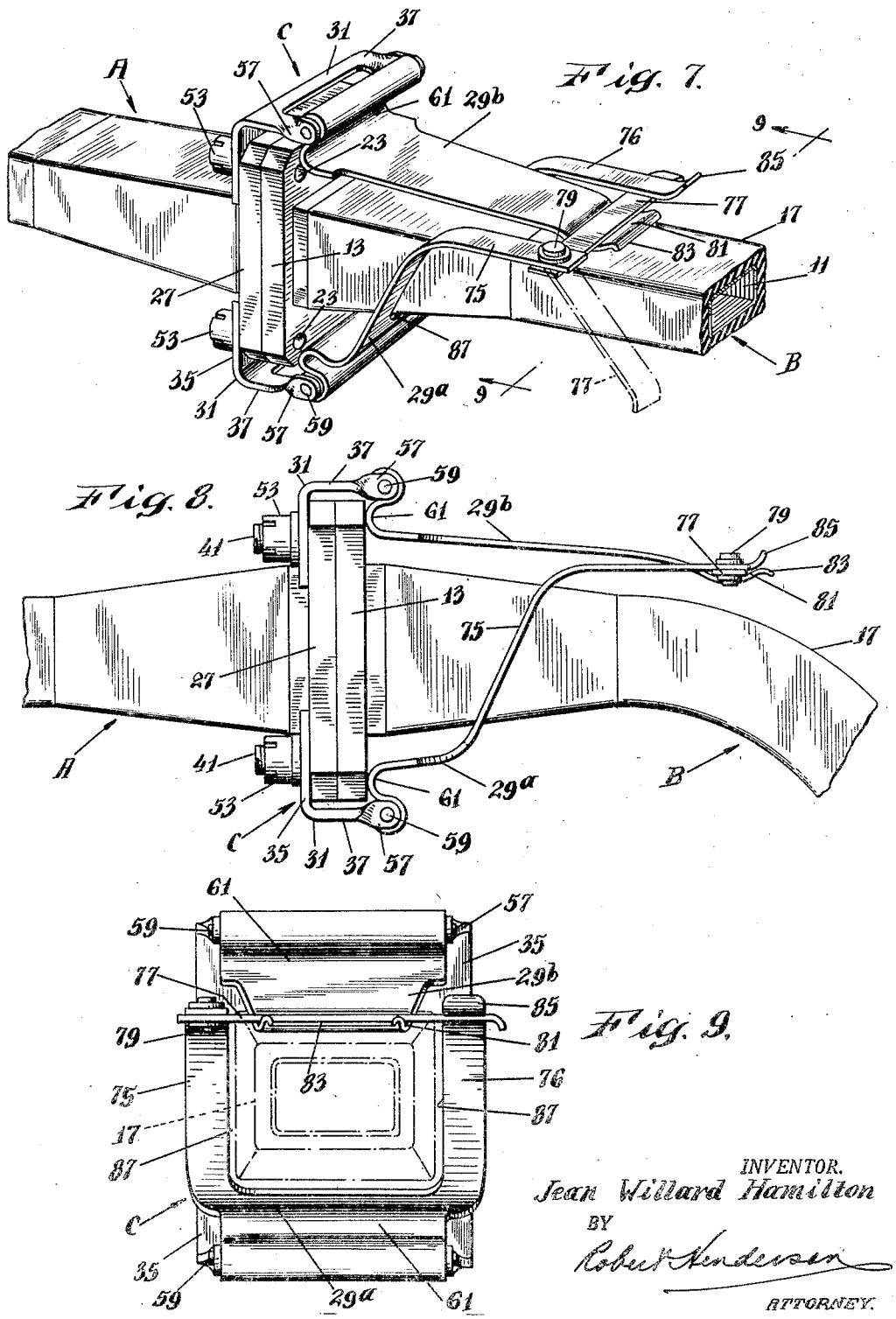
INVENTOR.
Jean Willard Hamilton
BY
Robert Henderson
ATTORNEY.

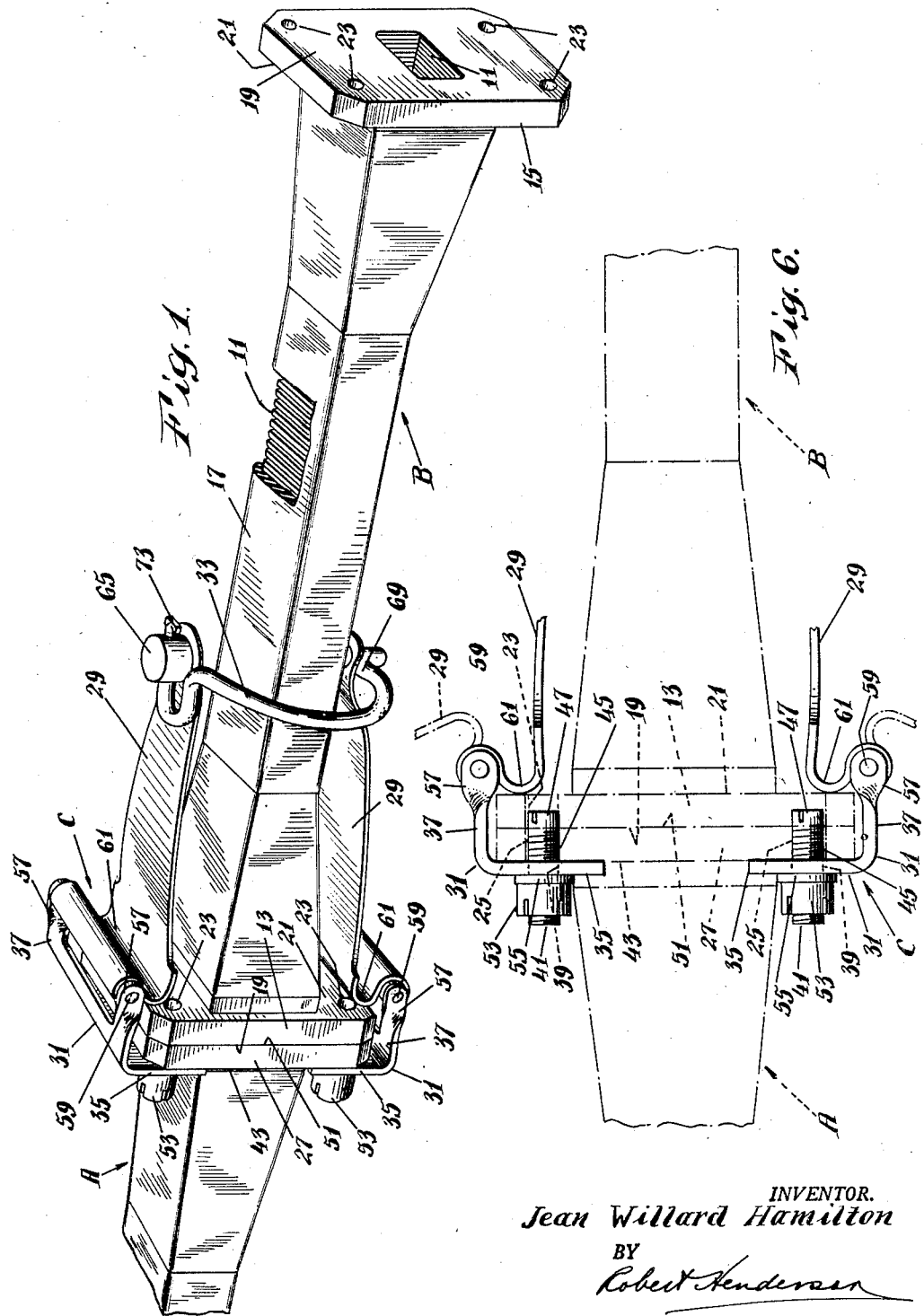
June 23, 1953 — J. W. HAMILTON — 2,643,139
QUICKLY OPERABLE CONDUIT CLAMP
Filed March 22, 1951 — 3 Sheets-Sheet 1
INVENTOR.
Jean Willard Hamilton
BY
Robert Henderson
ATTORNEY.

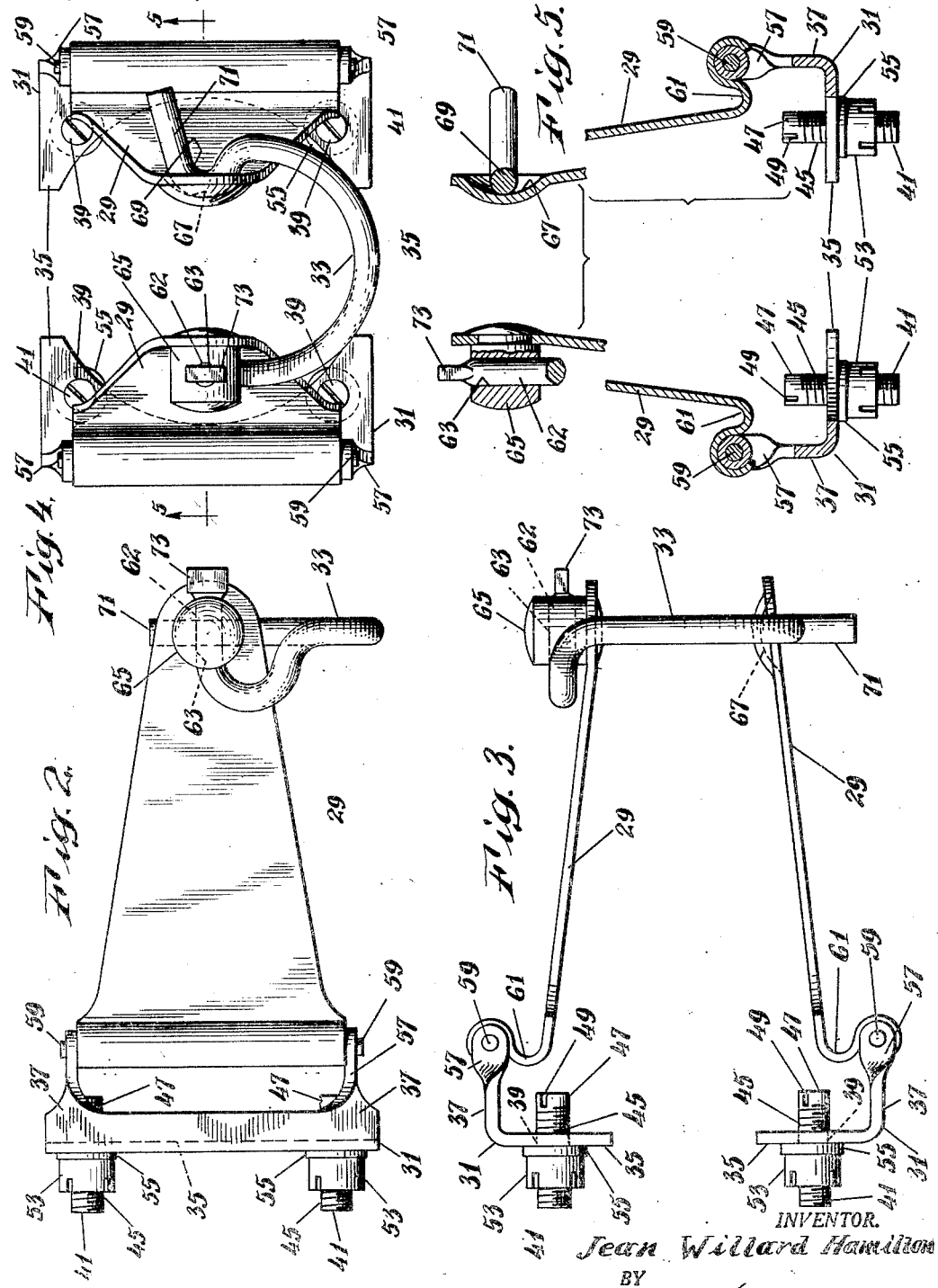

Patented June 23, 1953

2,643,139

UNITED STATES PATENT OFFICE 2,643,139

QUICKLY OPERABLE CONDUIT CLAMP

Jean Willard Hamilton, Montclair, N. J., assignor to Airtron, Inc., Linden, N. J., a corporation of New Jersey Application March 22, 1951, Serial No. 216,951

4 Claims. (Cl. 285—129)

This invention relates to a quickly operable clamp for use in holding together plural conduit elements in endwisely interconnected relationship, and, more particularly, relates to such a clamp which, without the use of any tools, permits quick connection and disconnection of such conduit elements.

Although the present invention may be used as a means for connecting various types of conduits, nevertheless it is disclosed in this application as designed for use in interconnecting flexible waveguides such as are employed for conducting microwaves in radar and other electronic equipment, without, however, limiting the invention to such particular designs and uses.

Flexible waveguides are usually in the form of metal tubing, rectangular in cross-sectional shape, covered by a suitable protective jacket which usually is of relatively soft rubber or equivalent flexible material. They are commonly provided with flanges at each end for interconnecting one waveguide with other waveguides or with other parts of electronic equipment. The metal tubing ordinarily is formed of electrically conductive material in such manner that it may flex quite freely, for one important reason among others, to permit the waveguide to be installed readily in association with other parts of electronic equipment that may be out of alignment and therefore require bending or twisting of an interconnecting waveguide to effect proper connections.

It has been common in the past to interconnect such waveguides by means of bolts which extend through mating holes in the connection flanges of the waveguides. Such a bolt connection arrangement, however, does not lend itself to quick connection and disconnection, which sometimes is highly desirable. In addition, the connection flanges are sometimes adjacent to a partition in the apparatus with the bolts quite inaccessible for disconnection.

An important object of the present invention is the provision of a clamp which may be employed with the type of end flanges ordinarily provided on flexible waveguides, but which, however, permits interconnection of a waveguide in electronic apparatus very quickly and likewise permits it to be disconnected very quickly.

Another object of this invention is the provision of such a quickly operable clamp which may be fixedly associated with an end flange of one flexible waveguide so that it cannot become separated therefrom and lost, and which is adapted for quick association with an end flange of another waveguide to interconnect the two.

Another object of the present invention is the provision of a quickly operable clamp which may be employed to interconnect a waveguide in an electronic apparatus in locations therein where it is difficult, and sometimes impossible, to provide access for tools for inserting or removing connection bolts.

Another object is the provision of such a quickly operable clamp which may be employed with a flexible waveguide and which does not in any way interfere with flexing of the waveguide even at a point in close proximity to the end flanges thereof.

The foregoing and other objects are accomplished by clamps according to the present invention, which, in their broader aspects, include a pair of locking levers, means for associating said levers pivotally with opposite lateral sides of a connection flange on one waveguide, and quickly operable means for holding the locking levers in locking positions in which they coact with an abutting connection flange on another waveguide to hold the two together.

Two preferred embodiments of this invention are disclosed and described herein, but such disclosure and description are solely for illustrative purposes and should not be taken as limiting the invention to those particular embodiments.

In the accompanying drawings:

Figure 1 is a perspective view showing a clamp according to a preferred embodiment of the invention in clamping association with two waveguides.

Fig. 2 is a top plan view of the clamp shown in Fig. 1.

Fig. 3 is a side elevational view of said clamp as viewed from the near side of Fig. 1.

Fig. 4 is an end view of said clamp as viewed from the right end of Figs. 2 and 3.

Fig. 5 is a transverse sectional view of said clamp substantially on the line 5—5 of Fig. 4.

Fig. 6 is a fragmentary cross-sectional view showing portions of the structure shown in Fig. 3, indicating also the positions which the locking levers occupy during a preliminary stage in a clamping operation; adjacent end portions of two waveguides also being shown to make clear the relationship of the clamp to the connection flanges of the waveguides.

Fig. 7 is a perspective view of the general character of Fig. 1, but illustrating a modified form of the invention which is particularly useful where one waveguide is to be bent at a point near its connection flange which is engaged by the clamp.

Fig. 8 is a side elevational view of said modified form of the invention as viewed from the near side of Fig. 7, and showing a bend in one of the waveguides, unrestricted by the clamp; and Fig. 9 is a transverse sectional view of the modified structure substantially on the line 9—9 of Fig. 7.

Referring first to the embodiment illustrated in Figs. 1–6, inclusive, and referring initially to Fig. 1 in particular, there are shown two waveguides A and B, held in interconnected end-to-end association by a clamp C, according to a preferred embodiment of the present invention.

Waveguide A may be a flexible element, or it may be a rigid waveguide which sometimes is spoken of as rigid plumbing. Waveguide B, however, is illustrated as being flexible and as comprising a hollow, flexible conducting core 11, of generally rectangular shape in transverse section, having end connection flanges 13 and 15 conductively fixed to opposite ends, as, for example, by being soldered to the core, and a protective jacket 17 extending completely about the conducting core.

The conducting core 11 may be formed of relatively thin conducting metal suitably grooved circumferentially to enable it to be bent to facilitate its installation into a piece of electronic apparatus. A highly satisfactory conducting core has been formed by spirally winding longitudinally groove and flanged strip metal upon a cross-sectionally rectangular shaped arbor in such manner that flanged edge portions of one turn of the strip material fold into and interlock with an opposed edge portion of the next adjacent turn of strip material. The longitudinal grooves in such strip material thus become circumferential grooves in the formed metal tubular core permitting the core to be flexed or bent in several directions.

The end connection flanges 13, 15 of the waveguide B are similar and are each formed with an end face 19 and an inner face 21. These flanges are formed with central rectangular apertures corresponding to and accommodating the open ends of the core 11, and are also provided with bolt holes 23 which are positioned to mate with similar bolt holes 25 in an end connection flange 27 fixed upon the end of the waveguide A and adapted to receive therewithin conventional bolts for interconnecting two flanged waveguides or other parts of electronic apparatus.

According to conventional practice, the bolt holes 23 need not be threaded, and two waveguides are interconnected by bringing together the end faces of one of each of their end connection flanges and bolting them together. The present invention resides in quickly operative means to be used in place of the mentioned bolts.

The protective jacket 17 preferably is formed of suitable flexible rubber, flexible synthetic rubber, or other relatively non-conductive flexible rubber-like material, which may be molded upon the exterior of the conducting core to extend completely therearound.

The clamp C comprises a pair of substantially similar locking levers 29 and substantially similar angle plates or brackets 31 by which the levers are pivotally fixed to an end connection flange of one of two waveguides or other members intended to be interconnected. The clamp also includes lever-holding means in the form of a "U" shaped link 33 which may be quickly manipulated either to hold the levers 29 in their locking relationship or to release said levers to permit them to be swung to their non-locking positions. Inasmuch as the angle brackets 31 and the levers 29 in each member of their respective pairs are substantially alike, the following description of each of said members should suffice as descriptive of the pairs of said members.

An angle bracket 31 is preferably formed of flat metal having a transverse flange 35 and a longitudinal flange 37 (the terms "transverse" and "longitudinal," or similar directional terms, being employed herein in relation to the longitudinal and transverse extensions of the interconnected waveguides). The transverse flange 35 is provided with bolt holes 39 to accommodate therewithin bolts 41 for mounting the bracket 31 upon the inner face 43 of the end connection flange 27 of waveguide A. The bolts 41 preferably are headless and of substantially uniform diameter from end to end, being externally threaded at their left ends as shown at 45 in Figs. 2, 3 and 6, and being plain at their right or driving ends 47 as viewed in said figures. The driving ends 47 may be slotted, as at 49, to accommodate a screw-driver, or they may be hexagonally recessed to receive a hexagonal wrench.

When it is desired to mount an angle bracket 31 upon an end connection flange such as flange 27 of waveguide A, the bolt holes 25 of said flange are preferably threaded to receive the bolts 41, which are threaded thereinto from the end face 51 of the flange 27, as best understood from Fig. 6. Inasmuch as the driving ends 47 of the bolts are not threaded, the said driving ends will protrude from the end face of the connection flange 27 to some extent. The angle bracket 31 is placed against the inner face 43 of the flange 27 with the bolts extending through the bolt holes 39 in the flange 35 of the angle bracket, and the latter is then held firmly in place by nuts 53, which are locked against unintentional loosening by lock washers 55. It may be seen clearly from Fig. 6 that the connection flange 13 of waveguide B may be brought into juxtaposition with the connection flange 27, with the end faces 19 and 51 in intimate contact and with the driving ends of the bolts 41 extending to some extent into the bolt holes 23 of the flange 13.

It may also be understood from Fig. 6 that the longitudinal flange 37 of the angle bracket 31 overlies corresponding edges of the connection flanges 13 and 27. The flange 37 is formed with spaced lugs 57 between which is fulcrumed one end of the locking lever 29, the flat metal of which the latter preferably is formed being curled at said end to form a journal or bearing within which extends a fulcrum pin 59 fixed at its opposite ends in the lugs 57.

The lever 29, as viewed in side elevation as in Fig. 3, is of U shape at its fulcrum end to form a locking portion 61 which, in one angular position of the lever as indicated in broken lines in Fig. 6, is located entirely outwardly of the inner surface of the lugs 57 to which the locking lever is pivoted. When the lever 29 is in the last-mentioned position, hereinafter sometimes referred to as its non-locking position, the flange 13 of waveguide B may be moved axially into position with its end face 19 in intimate contact with the end face 51 of the connection flange 27 of the waveguide A. The two waveguides are then in conducting contact, but, in order to maintain this contact, the two levers 29 are swung inwardly to their locking positions indicated in full lines in Fig. 6 and also as shown in Fig. 1. When the levers 29 are in their locking positions, their locking portions 61 are in axial alignment with and in contact with marginal portions of the connection flange 13, and the two connection flanges 27 and 13 are firmly clamped and held together between the transverse flange 35 of the angle bracket 31 and the locking portions 61 of the levers 29.

Although various means may be employed for holding the levers 29 in their locking positions, in which they preferably lie substantially parallel to and quite close to the broader side faces of the jacket 17, nevertheless it is preferred to provide a member, such as the U shaped link 33, to thus hold said levers. A feature of this invention resides in the arrangement by which the link 33 may be very quickly manipulated either to a closed or holding position in which it holds the levers 29 in their locking positions, or to an open position in which it releases the levers 29 so that they may be swung from their locking to their non-locking positions.

To permit such quick manipulation, the link 33 is pivoted at its upper end (as viewed in Fig. 1) to the free end of one lever 29, this being accomplished by bending said end of the link 33 to form a pivot-pin portion 62 which extends in a longitudinal direction through a bore 63 in a block 65 fixed to the free end of the said one lever 29. The free end of the other lever 29 is formed with an outwardly facing recess 67, and the free end of the link 33 is bent sharply inwardly and then back upon itself and outwardly to form a detent 69 adapted to seat within the recess 67 and a finger 71 which may be manipulated to push the link so that the detent 69 will move into or from the recess 67. The pivot end of the link 33 is flattened or otherwise deformed, as at 73, to prevent its unintended withdrawal from within the block 65.

The link 33 preferably is of wire which is quite rigid, and the levers 29, although also quite rigid, may nevertheless flex slightly to permit the detent 69 to be moved into holding position in the recess 67 or to be moved from said recess to non-holding position; but the levers 29, nevertheless, should be of such low resiliency that the detent will not unintendedly become dislodged from the recess 67.

From the foregoing description it should be clear that two waveguides may be quickly brought together for connection purposes, and may then be clamped together quickly by merely swinging the levers 29 inwardly to their locking positions and then swinging the link 33 into its holding position; and that the reversal of this operation will serve to release the waveguides very quickly from their interlocked positions so that they may be readily separated when so desired.

The embodiment illustrated in Figs. 7–9, inclusive, differs from the embodiment of Figs. 1–6, inclusive, principally in that one of the locking levers, designated 29a, is bifurcated to provide two arms 75, 76 which are bent upwardly, as viewed in the drawings, to extend at opposite sides of the waveguide, and thence in a longitudinal direction in substantial parallelism with the free end of the other locking lever designated as 29b.

In this embodiment the lever-holding means, employed instead of the link 33 of the embodiment of Figs. 1–6, consists of a substantially rigid cross member 77 which is pivoted to the end of arm 75, as at 79, to enable it to swing in a horizontal plane, as viewed in the drawings, from its open position, shown in broken lines in Fig. 7, to its holding position, shown in full lines in said figure, in which the free end of the cross member 77 underlies an end portion of the arm 76 and an intermediate portion of the cross member 77 overlies an end portion of the locking lever 29b.

The free end of the locking lever 29b may advantageously be formed with a transverse depression 81 and a downwardly curved end lip 83 which serves to guide the cross member to its overlying position in relation to the lever 29b. The free end of the arm 76 may be formed with an upwardly curved end lip 85 to guide the cross member to its underlying position in relation to said arm. The resiliency of the locking levers 29a, 29b is such that they will yield to some extent as the cross member is moved in either direction over the lip 83 and under the lip 85, and will hold the cross member 77 against unintended dislodgment from its position in the depression 81.

It may be observed that the arms 75, 76 define an intervening space 87 which is somewhat wider than the adjacent largest diameter of the waveguide, so that the waveguide may be bent downwardly, as shown in Fig. 8, without suffering any interference whatever from the clamp. The embodiment presently being described obviously should be very useful in situations in which it may be desired to bend a waveguide at a point quite close to one of its end connection flanges.

While the present invention has been described, for illustrative purposes, as employed to interconnect waveguides having transversely extending end connection flanges, it should be clear that the invention is useful for interconnecting waveguides or other conduits having end connection means other than such transverse flanges; hence, any reference herein and in the accompanying claims to "end connection flanges," or any terminology of like substance, shall be understood as referring broadly to any end connection means with which the principles of this improvement may be operative.

It may readily be understood that the objects of this invention may be achieved by the particular embodiments described and illustrated in this application, but that said objects nevertheless may be realized from the use of various other embodiments without departing from the invention as set forth in the following claims.

What I claim is:

1. A quickly operable conduit clamp for interconnecting conduit elements having abutting end connection flanges with axially aligned holes therein, the clamp comprising a lever-supporting element adapted for association with one such connection flange and having plural studs each adapted to extend with a close fit through one of said holes in said one flange and into an aligned one of said holes in the other of such connection flanges, whereby to hold the thus related conduit elements against material relative rotation about a common longitudinal axis; and a clamping lever pivotally carried by said supporting element and adapted to be swung into clamping engagement with the said other connection flange.

2. A clamp according to claim 1, further characterized in that said clamping lever has an intermediate locking portion adapted, when the lever is in locking position, to engage a transversely extending surface of said other connection flange to hold the two said flanges together, and in including holding means pivotally carried by said one flange independently of said clamping lever and being inseparable from said one flange in operation and adapted to coact with said lever, toward the latter's free end, for holding the lever in its locking position.

3. A clamp according to claim 1, further characterized in that said studs also constitute means for affixing said lever-supporting element to said one such connection flange.

4. A clamp according to claim 1, further characterized in including a second such clamping lever, pivotally carried by said one flange and a holding link pivotally connected to one of said levers and being adapted to pivot into releasable connection with the other of said levers when the two levers are in their clamping positions whereby to hold the two levers in such clamping positions.

JEAN WILLARD HAMILTON.

References Cited in the file of this patent

UNITED STATES PATENTS

| Number | Name | Date |
|---|---|---|
| 1,326,858 | Glasscock | Dec. 30, 1919 |
| 1,483,454 | Kraft | Feb. 12, 1924 |
| 1,991,343 | Ball | Feb. 12, 1935 |
| 2,423,726 | Prata | July 8, 1947 |
| 2,576,298 | Kessler | Nov. 27, 1951 |

FOREIGN PATENTS

| Number | Country | Date |
|---|---|---|
| 337,034 | Great Britain | Oct. 27, 1930 |